US010452708B2

(12) United States Patent
Wansley et al.

(10) Patent No.: US 10,452,708 B2
(45) Date of Patent: Oct. 22, 2019

(54) METHOD AND SYSTEM FOR GENERATING LOCATION-BASED PLAYLISTS

(71) Applicant: Google LLC, Mountain View, CA (US)

(72) Inventors: Andrew Theodore Wansley, San Francisco, CA (US); Sean Liu, El Dorado Hills, CA (US); Rita Chen, Forest Hills, NY (US)

(73) Assignee: Google LLC, Mountain View, CA (US)

( * ) Notice: Subject to any disclaimer, the term of this patent is extended or adjusted under 35 U.S.C. 154(b) by 732 days.

(21) Appl. No.: 14/981,086

(22) Filed: Dec. 28, 2015

(65) Prior Publication Data

US 2016/0275186 A1 Sep. 22, 2016

Related U.S. Application Data

(63) Continuation of application No. 13/559,592, filed on Jul. 26, 2012.

(51) Int. Cl.
*G06F 16/638* (2019.01)
*G06F 16/68* (2019.01)
(Continued)

(52) U.S. Cl.
CPC .......... *G06F 16/639* (2019.01); *G06F 16/637* (2019.01); *G06F 16/68* (2019.01); *H04W 4/021* (2013.01)

(58) Field of Classification Search
CPC ......... G05F 17/30038; G05F 17/30749; G05F 17/30761; G05F 17/30766; G05F 17/30687; G05F 17/30772; G05F 17/30053; H04W 4/02; H04W 4/18; H04W 4/023; H04W 4/04; H04L 64/18; H04N 21/4525; G06F 17/30038; G06F 17/30749; G06F 17/30761; G06F 17/30766; G06F 17/30687;
(Continued)

(56) References Cited

U.S. PATENT DOCUMENTS

2007/0244880 A1 10/2007 Martin et al.
2008/0091717 A1* 4/2008 Garbow ............ G06F 17/30749
(Continued)

OTHER PUBLICATIONS

"Communication Pursuant to Article 94(3) EPC", dated Feb. 11, 2016 issued in EP Application No. 13742074.1.
(Continued)

*Primary Examiner* — Andrew C Flanders
(74) *Attorney, Agent, or Firm* — Byrne Poh LLP (57) ABSTRACT

Methods, systems, and computer programs are presented for generating location-based playlists. The disclosed method includes providing a music service for generating playlists for a location, identifying users having respective user devices within the defined boundaries of the location, and aggregating music preferences of the identified users. Each of the user devices have access to the music service and the aggregated music preferences of the identified users identify a plurality of music tracks. The disclosed method further includes generating a playlist having the plurality of music tracks based on the aggregated music preferences and providing an access to the generated playlist to the identified users at the location. The plurality of music tracks of the playlist is provided for listening by the music service to one or more of the user devices.

18 Claims, 7 Drawing Sheets

(51) Int. Cl.
*G06F 16/635* (2019.01)
*H04W 4/021* (2018.01)

(58) Field of Classification Search
CPC ......... G06F 17/30772; G06F 17/30053; G06F 16/63; G06F 16/635; G06F 16/637; G06F 16/639; G06F 16/687
See application file for complete search history.

(56) References Cited

U.S. PATENT DOCUMENTS

| | | |
|---|---|---|
| 2008/0301187 A1 | 12/2008 | Svendsen |
| 2009/0298513 A1 | 12/2009 | Hampel et al. |
| 2009/0328087 A1 | 12/2009 | Higgins et al. |
| 2010/0037752 A1 | 2/2010 | Hansson et al. |
| 2010/0070490 A1 | 3/2010 | Amidon et al. |
| 2010/0114979 A1 | 5/2010 | Petersen |
| 2011/0295843 A1 | 12/2011 | Ingrassia et al. |
| 2012/0290653 A1 | 11/2012 | Sharkey |

OTHER PUBLICATIONS

Notice of Allowance dated Sep. 25, 2015 in U.S. Appl. No. 13/559,592.
Office Action dated Mar. 13, 2015 in U.S. Appl. No. 13/559,592.
Decision to Refuse a European Patent Application dated Apr. 13, 2017 in EP Patent Application No. 13742074.1.
International Search Report and Written Opinion dated Sep. 2, 2013 in International Patent Application No. PCT/US2013/049388.
Summons to Attend Oral Proceedings dated Oct. 26, 2016 in EP Patent Application No. 13742074.1.

* cited by examiner

METHOD AND SYSTEM FOR GENERATING LOCATION-BASED PLAYLISTS

BACKGROUND

Internet applications have grown tremendously over the years and so has the functionality provided to devices that access those applications. One area that has seen such growth relates to audio file management. An audio file management application enables a user to search and purchase music selections online and store the purchased music in cloud storage. Audio file management applications also enable users to access and play music stored in the cloud storage using a network connected device.

Playlist generation is a common function performed by users in order to organize their music for later playback. However, compiling the proper mix of music for a playlist can be a time consuming process. This is especially true when the playlist is designed for a group gathering or a sharing event at a specific location and time.

It is in this context that embodiments arise.

SUMMARY

Embodiments of the present disclosure provide methods, systems, and computer programs for generating location-based playlists. It should be appreciated that the present disclosure can be implemented in numerous ways, such as a process, an apparatus, a system, a device, or a method on a computer readable medium. Several inventive embodiments of the present disclosure are described below.

In one embodiment, a method for generating location-based playlists is disclosed. The method includes providing a music service for generating playlists for a location, identifying users having respective user devices within the defined boundaries of the location, and aggregating music preferences of the identified users. Each of the identified users is connected to the music service and the aggregated music preferences of the identified users identify a plurality of music tracks. The disclosed method further includes generating a playlist having the plurality of music tracks based on the aggregated music preferences, providing access to the generated playlist to the identified users at the location. The music service provides the plurality of music tracks of the generated playlist for listening to one or more of the user devices. The disclosed method may be executed by a processor.

In another embodiment, a system for generating a location-based playlist is disclosed. The disclosed system includes music logic, a recommendation framework, and a user access module. The music logic is configured to provide a music service for generating playlists for a location and identify users having respective user devices within defined boundaries of the location. Each of the devices having access to the music service. The recommendation framework is configured to aggregate music preferences of the identified users, and the aggregated music preferences of the identified users identify a plurality of music tracks. The recommendation framework is further configured to generate a playlist having the plurality of the music tracks based on the aggregated music preferences. In one embodiment, the recommendation framework is configured to adjust the generated playlist when a new user enters the location and is connected to the music service, or when any of the identified users exit the location. The user access module is configured to provide access to the generated playlist to the identified users at the location, and the plurality of music tracks of the generated playlist is provided for listening by the music service to one or more the user devices. In one embodiment, the user access module may be further configured to disconnect the access to the generated playlist to an identified user when the identified user exits the location.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

DETAILED DESCRIPTION

Methods and systems are provided to allow the automatic generation of playlists of songs, for a particular location. For example, when two or more users are identified to be at a location, a playlist of songs can be generated for the two or more users. The playlist will, in one embodiment, be granted based on analyzed music preferences of users at the location.

In some embodiments, the playlist can be generated from analyzed preferences of many users that may have gathered at a location, such as to attend a party. The autogenerated playlist can therefore take into account the collection preferences and thus present a playlist that most matches the collective user preferences.

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in a simple block diagram format in order to avoid unnecessarily obscuring the present disclosure. Thus, the specific details set forth are merely exemplary. Particular implementations may vary from these exemplary details and still be contemplated to be within the spirit and scope of the present disclosure.

Reference in the description to "one embodiment" or "an embodiment" means that a particular feature, structure, or characteristic described in connection with the embodiment is included in at least one embodiment of the disclosure. The appearances of the phrase "in one embodiment" in various places in the specification do not necessarily all refer to the same embodiment.

Embodiments of methods and systems are described for generating location-based playlists. In one embodiment, the disclosed method includes providing a music service for generating playlists for a location and identifying users having respective user devices within the defined boundaries of the location. Each of the identified users is connected to the music service. The music preferences of the identified users are aggregated and the aggregated music preferences of the identified users identify a plurality of music tracks. The disclosed method further includes generating a playlist having the plurality of music tracks based on the aggregated music preferences and providing an access to the generated playlist to the identified users at the location. The music service provides the plurality of music tracks of the generated playlist for listening to one or more of the user devices. In one embodiment, the processing of playlist generation is completed on a network server of a music service provider and the playlist is presented to a user device on a user interface (UI) provided by the music service provider. In such an embodiment, the user receives the playlist on the user device that has network access to the music service provider and is therefore able to render the UI on the user device.

Figure 1:
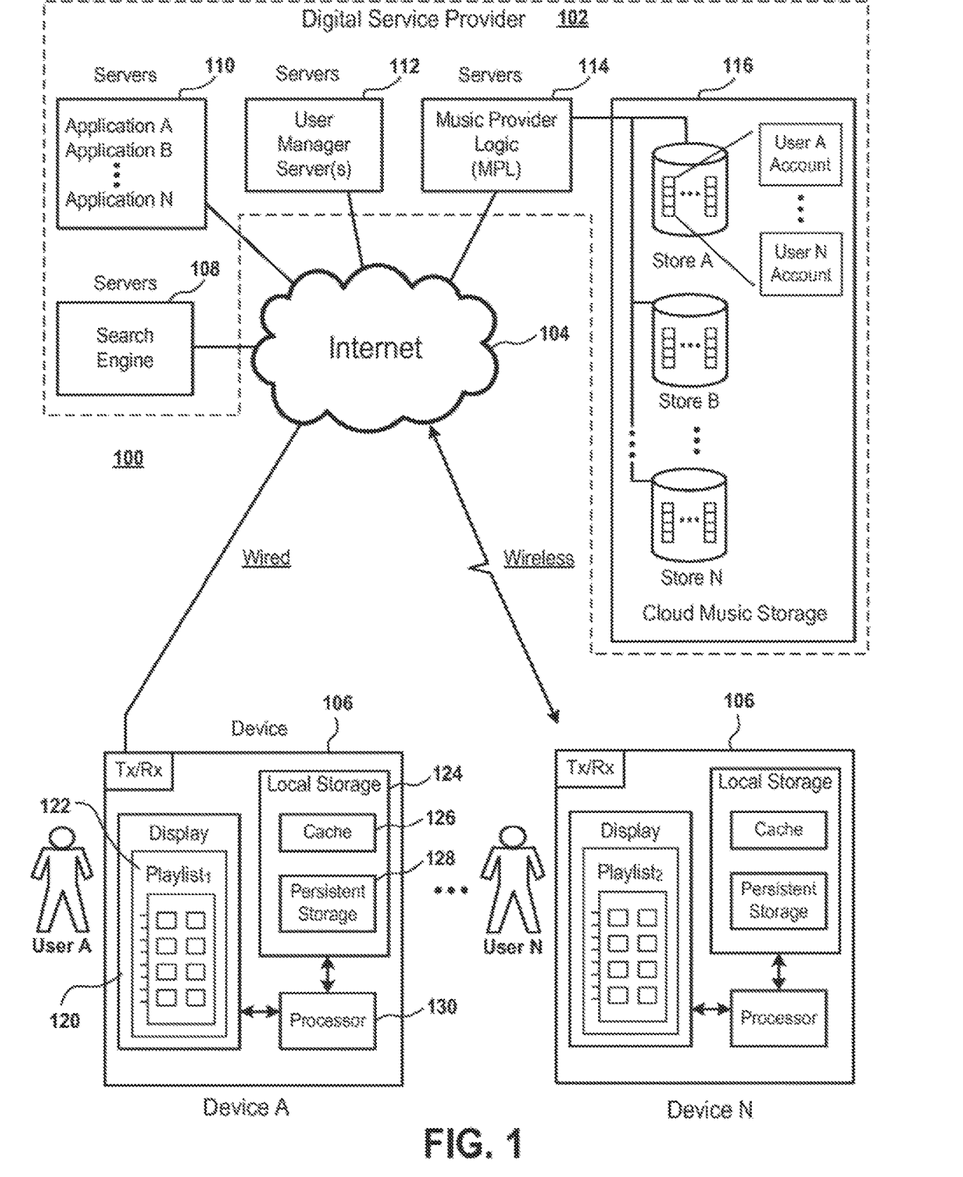
FIG. 1 illustrates a system diagram for enabling access and playing of music files stored in a cloud music storage, in accordance with one embodiment of the present disclosure.

FIG. 1 illustrates a system diagram 100 for enabling access and playing of music files stored in cloud music storage, in accordance with one embodiment of the present disclosure. The system 100 includes a plurality of servers that are connected to the Internet 104. The plurality of servers and storage are, in one embodiment, part of a digital service provider 102. The digital service provider 102, is a system that can include a plurality of servers that can provide applications, services, digital content, and interconnectivity between systems, applications, users, and social networks. For example, the digital service provider 102 can include a search engine 108, a plurality of servers 110 that provide applications for various business, social, and technology related subject matter, servers that provide user management 112, and servers to provide music related services 114.

One example digital service provider 102 can be Google Inc., of Mountain View Calif. Some digital service providers may be more focused on providing only specific services, while others provide a variety of services for access, download, viewing, searching, etc. The content can vary greatly, but is commonly presented in digital format and displayed on monitors or screens of devices, computers, smartphones, tablets, etc.

The servers that provide music related services, in one embodiment, are illustrated by the music provider logic 114, that executes over one or more servers that are connected to the Internet 104. The music provider logic 114 is shown connected to a cloud music storage 116. Cloud music storage 116 is shown to include a plurality of storage systems, identified as store A, store B, . . . store N. The various storage systems that hold music data and music metadata, are provided with fast access to the Internet, for providing music data on demand to users requiring access to their music accounts stored in cloud music storage 116. In one embodiment, users can access the cloud music storage 116 by way of a plurality of devices 106. The plurality of devices can include any type of device having a processor and memory, wired or wireless, portable or not portable. In the example illustrated in FIG. 1, user A is shown to have device 106 (device A). Device 106 is shown to include communication logic for transmitting and receiving data between device 106 and the Internet 104.

The communication logic (Tx/Rx) can include various types of network interface circuitry, radio-communication (e.g. wireless), cell tower communication, or interconnected wiring connected to Internet service providers. Device 106 is also shown to include a display having a screen 120, local storage 124, and a processor 130. Local storage 124 can include cash memory 126, persistent storage 128, and other logic. In this example, device 106 is shown to include graphical icons (e.g., graphical user interfaces GUIs) that represent a play list. The screen 120 can be a touch-screen, or a display typically provided by a flat-panel display, a cathode ray tube (CRT), or other media capable of rendering a display. Still further, device 106 can have its display separate from the device, similar to a desktop computer or a laptop computer. Still further yet, device 106 can be in the form of a smartphone, a tablet computer, or hybrids that provide touch screen capability in a portable form factor. One example device can include a portable phone device that runs an operating system and is provided with access to various applications (apps) that may be obtained over the Internet, and executed on the local portable device (e.g., smartphone, tablet, laptop, desktop, etc.).

In one embodiment, the user of device 106 can install an application that provides cloud storage of music files, and access to the storage cloud music files from the device 106. Once the user's music files are uploaded to the cloud music storage 116, the user's music files are associated to a library of the user. In one embodiment, a plurality of users can access the same application and can upload their own music files to create their own library, which will be stored in the cloud music storage 116.

Each of such users can then access the cloud music storage 116 through an application on their device 106 to render and play selected music files on their device, when the device 106 has access to the Internet and associated servers of the music provider logic 114 and cloud music storage 116. Accordingly, users can access the music application on their device 106, access all music files stored in cloud music storage 116, arrange music titles in their music library into playlists, add music to the cloud music storage 116, delete music from the cloud music storage 116, and purchase music that is added to the cloud music storage 116. These changes are maintained and managed by the music provider logic 114 and the music provider logic 114 will provide access to the various users to their music files stored in the cloud music storage 116, based on their selections during use of the application.

Figure 2:
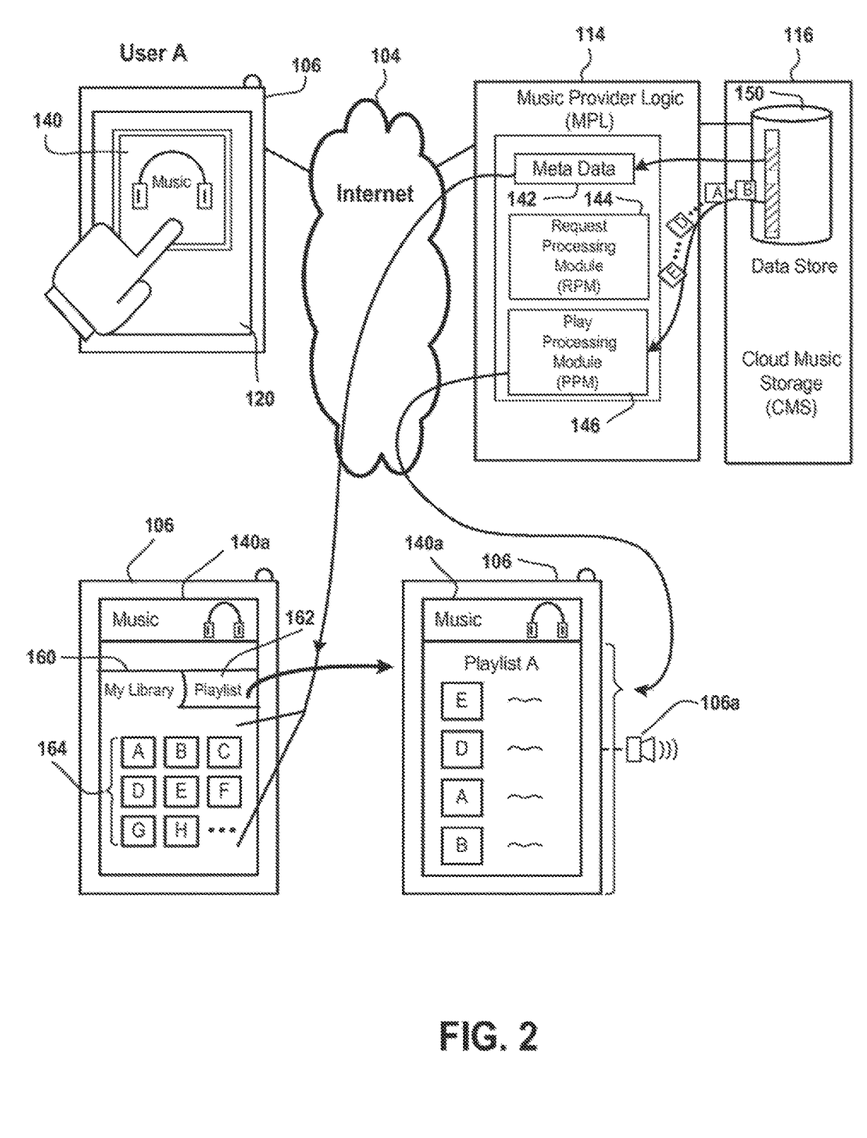
FIG. 2 illustrates how user A utilizes a device (e.g. smartphone) to access his or her music account stored in the cloud music storage (CMS), in accordance with one embodiment of the present disclosure.

FIG. 2 illustrates how user A utilizes a device 106 (e.g. smartphone) to access his music library stored in the cloud music storage (CMS) 116, in accordance with one embodiment of the present disclosure. As shown, the device 106 will include a screen 120, and associated graphical icons that present a thumbnail of an application 140, associated with a music application. Application 140, as described herein, relates to an application that provides a user with access to his or her music library which has been previously added to the cloud music storage 116. If the user is a new user to the application 140, the new user can download application 140 to device 106 from at least one server 110 of the digital service provider 102.

Once the application 140 has been downloaded and installed on device 106, the icon representing application 140 will be rendered on the display screen of device 106. Initially, the user will be prompted to select music to add to the cloud music storage 116. The music may be added from files currently maintained by the user on his or her device 106, on other devices of the user such as computers, other smartphone and or tablets, or other storage media. Additionally, the user can add music files that may be part of a music library maintained by another application. The other application may maintain a specific format for the music, and the music can be obtained and translated to standardize music files for addition to the cloud music storage 116.

Once the user has managed his library to add, modify, or adjust the music files present in the cloud music storage 116, the user can access application 140 and various options from graphical user interfaces provided on the screen 120 of device 106. In the illustrated example, device 106 will open application 140 through various graphical user interface screens, such as interface 140a. Interface 140a can include various menus, selection icons, configuration icons, displays, advertisements, buttons, listings, etc. In this example, the interface 140a may include an image that lists the users library 160, the users playlists 162, and music title icons 164. Music title icons can be represented by graphical artwork that represents artwork associated with the various music files present in the users library. The users library is illustrated by music title icons 164, shown as A-H.

The music title icons 164 are rendered on the screen 120 upon obtaining metadata from the cloud music storage 116 (or accessing the metadata from previous download(s) stored locally on the user device), which may be present in data store 150. Music provider logic 114 will include request processing module 144 that manages the requests and communication between various users applications 140 and the cloud music storage 116. The request processing module (RPM) 144 is also in communication with a play processing module (PPM) 146. In order to render the title icons 164 on the screen of the device 106, the music provider logic 114 will utilize the request processing module 144 to obtain metadata 142 from the data store 150.

The metadata 142 will be the metadata associated with the various music files stored in data store 150. The metadata 142 provides information regarding each of the titles stored in the cloud music storage 116, and sufficient information to render the title icons 164 on the screen of device 106, and provides text information, duration information, genre information, and other data that describes aspects or characteristics of the music files. As shown, when the user selects playlist 162 on device 106, a playlist graphical user interface is shown identifying particular songs that have been arranged by the user.

Playlist A, part of the playlist 162, represents various songs that were selected by the user. The user can have various playlists, and the selection of playlist A is only provided as one example of a playlist that includes music files that are played in the order E→D→A→B. Once the user selects a corresponding play button or clicks on one of the audio files in the playlist, the music files will begin to play, via the speaker 106a, in the order arranged and defined by the user in his or her playlist A.

Figure 3:
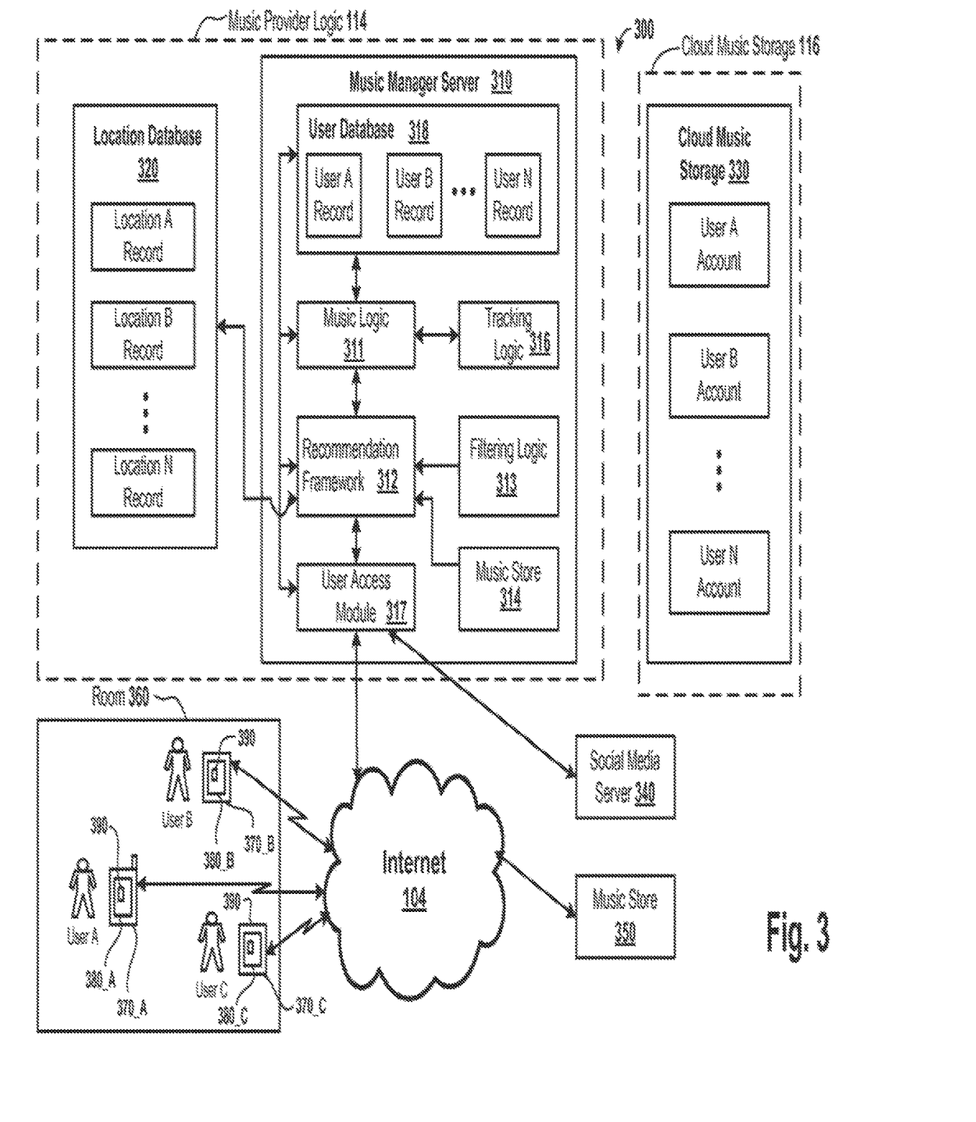
FIG. 3 illustrates a system diagram for generating location-based playlists, in accordance with one embodiment of the present disclosure.

FIG. 3 illustrates a system diagram 300 for generating location-based playlists, in accordance with one embodiment of the present disclosure. The system 300 includes a music manager server 310, a location database 320, a cloud music store 330, a social media server 340, and a music store 350.

In one embodiment, the music manager server 310 and the location database 320 are part of the music provider logic 114, and the cloud music store 330 is part of the cloud music storage 116, as shown in FIG. 1. In other embodiments, the music manager server 310 and the location database 320 may be defined from separate processing systems. For example, the music manager server 310 may be stored in a separate processing system to be accessed by users over the internet 104, and the location database 320 may be stored in a storage managed by a separate server that works in conjunction with or in coordination with the music provider logic 114.

As shown in FIG. 3, the music manager server 310 includes music logic 311, a recommendation framework 312, filtering logic 313, a music store 314, tracking logic 316, a user access module 317, and a user database 318. The user access module 317 may be used to handle a user's music account login request and to communicate the user login information to the user database 318. In one embodiment, the user access module 317 has access to a social media server 340 that maintains a plurality of social network user profiles. Providing access to a user's social network may, for example, allow social interaction and sharing with friends. This may include sharing user likes, dislikes or music preferences with friends.

In one embodiment, the sharing can include sharing of playlists, comments regarding the music itself, etc. The social information can also be shared in the user's social network streams, during live chats or video chats.

In the example illustrated in FIG. 3, three users (user A, user B, and user C), who may access to services provided by the music manager server 310, are shown inside a room 360. It is to be understood that in practice, many more or less users, who are located within defined boundaries of a location, may access the services provided by the music manager server 310, and the service can be widely distributed across a network. In this example, each of the users (user A, user B, and user C) has a respective user device (370_A, 370-B, or 370_C), and each of the user devices has an application or code for accessing online music and the respective online music account.

In one embodiment, after a user, e.g., user A, has logged into his or her music account online, the user access module 317 will send the user login information to the user database 318 to be stored in a user record, e.g., the user A record. The user database 318 may be used to store a plurality of user records with each user record being associated with a user. Each user record stored in the user database 318 may document a user's music online activities, such as the user's music account login status, information regarding songs purchased by the user, the user's music collections, etc. Each user record stored in the user database 318 may also document a user's music listening history, such as created playlists, number of times a song is listed in various playlists, favorite songs or artists, various song ratings, play counts for each song in the user's music collection, etc.

In one embodiment, the user database 318 communicates with the cloud music store 330 so that various user accounts stored in the cloud music store 330 may be updated based on respective user records stored in the user database 318. The music logic 311 and the tracking logic 316 may communicate with the user database 318 to identify how many users, who have logged into their respective music accounts, are currently located within defined boundaries of a location.

In one embodiment, tracking a user's location is an option that may be set and first approved by each user, if particular users wish to utilize the location-based playlist generation feature. If a user does not wish to use the location-based playlist generation feature, the user's location will not be tracked.

In one embodiment, the tracking logic 316 may track the locations of the users by tracking the location of user devices of those users and pass the user location information to the music logic 311. In other embodiments, the tracking logic 316 may obtain tracking data from other tracking services, or location identifying services. For example, location identifying services may include, without limitation, signal processing from cellular towers, GPS processors, Wi-Fi signals, IP address resolution processors, etc.

As will be discussed below, tracking and identifying the location of a user's device enable processing to generate playlists that may be relevant to the other users who may be at the same location. In the embodiment shown in FIG. 3, user A, user B, and user C, are currently in room 360, have logged into their respective music accounts online via their respective user devices (370_A, 370-B, and 370_C). The user login information will be handled by the user access module 317, which in turn, sends the user login information to the user database 318 to be stored in the respective user records. In one embodiment, after obtaining the user login information from the user database 318, the music logic 311 may provide a music service for generating location-based playlists to user A, user B, and user C in room 360 in the form of the music service icons or buttons 390, in the display screens (380_A, 380_B, and 380_C) of the user devices (370_A, 370_B, and 370_C). In one embodiment, the music service provided by the music logic 311 may be provided via the user access module 317 by providing a user interface (UI) to the display screens of the user devices.

In one embodiment, the music logic 311 may obtain the music listening histories of user A, user B, and user C from their respective user records stored in the user database 318, and pass the user music listening histories to the recommendation framework 312. In one embodiment, the music listening histories of a user defines the user's music preferences. The recommendation framework 312 may aggregate the obtained music listening histories of user A, user B, and user C and generate one or more playlists accordingly. In one embodiment, the generated playlist may be displayed to a user, e.g., user A, when user A clicks on (i.e., accesses) the music service icon or button 390 in the display screen 380_A of the user device 370_A.

In one embodiment, the users identified by the music logic 311 are the users who have logged into their respective music accounts and who are within the defined boundaries of a location. As noted above, the boundaries of a location can be identified by obtaining location data from one or more location identifying services. In the example illustrated in FIG. 3, the defined boundaries of the location may be the walls of the room 360. In other embodiments, the defined boundaries of the location may be exterior walls of a building or a section of a building. In some embodiments, the defined boundaries can be more generally defined, such as within an approximate city block, within a certain radius or zone. The zone may be relative to a map address, and may also include identification of vertical space. Vertical space may be useful if the location relates to identifying the floor or approximate floor in a multi-floor building.

In one embodiment, after the music logic 311 sends the information about the identified users to the recommendation framework 312, the identified users may be filtered by the filtering logic 313. Initially, filtering may be based on the defined boundaries. The identified users may further be filtered by the filtering logic 313, based on social affinity of the identified users. In one embodiment, the social affinity of the identified users may be defined by social network connections of the identified users. In the example illustrated in FIG. 3, music logic 311 has identified user A, user B, and user C to be within the room 360. In one embodiment, if user A and user B are social network friends and user C is not a social network friend of user A and user B, the music preference of user C may be excluded or ignored when the recommendation framework 312 aggregates the music preferences of the identified users.

In one embodiment, the playlist generated by the recommendation framework 312 is a global playlist that includes music tracks having the highest music preferences. The music tracks in the generated playlist may be stored in various users' music libraries of the user accounts in the cloud music store 330. In another embodiment, the recommendation framework 312 may further generate a plurality of sub-playlists, based on the global playlist, with each sub-playlist including a portion of the music tracks in the global playlist, and the portion of included music tracks in each of the sub-playlists may belong to the same music category.

In one embodiment, the recommendation framework 312 may adjust the generated playlist when a new user, who has logged into his or her music account, enters the location, or when any of the identified users exit the location. The new user having a user device may be identified by the music logic 311 via the location data of the user device detected by the tracking logic 316. Similarly, a user who exits the location may be identified by the music logic 311 via the location data of the user device provided by the tracking logic 316. In one embodiment, the playlist generated by the recommendation framework 312 for a location may be stored in a location record in the location database 320, at pre-defined time frames if the playlist has been adjusted during the pre-defined time frame. For example, the playlist generated by the recommendation framework 312 may be stored in a location record for room 360 every hour if the generated playlist has been adjusted or updated during this hour.

In one embodiment, the user access module 317 may provide access to the generated playlist to the identified users so that the music tracks listed in the playlist may be played or listened by the identified users. In one embodiment, the access may be provided to one or more user devices of the users who own all or a large portion of the music tracks listed in the playlist. In another embodiment, the access may be alternately provided to a user device of a user who owns the music tracks to be played in the playlist. In one embodiment, after the music logic 311 identifies a user who has exited a location, the user access module 317 may disconnect access to the playlist to this user.

In one embodiment, if user C has very different music preference than the music preferences of user A and user B, user C may be identified by the recommendation framework 312 as an outlier and the music preference of user C may be excluded, down weighted, or ignored by the recommendation framework 312, when aggregating the music preferences for the identified users in room 360.

In one embodiment, the recommendation framework 312 may be configured to recommend music tracks to any of the identified users based on the music tracks being played or that have been played in the playlist. The recommended music tracks may be purchased from the online music store 314 or from an external music store 350 provided by another music service provider.

Figure 4:
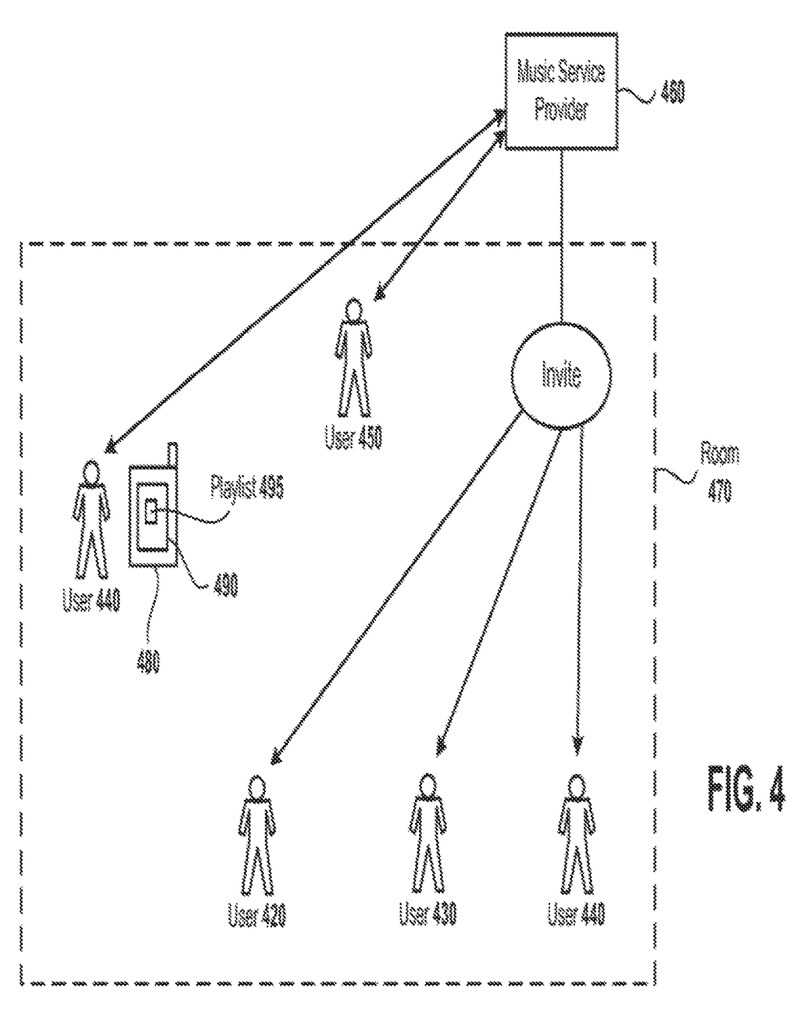
FIG. 4 illustrates a method for identifying users within defined boundaries of a location, in accordance with one embodiment of the present disclosure.

FIG. 4 illustrates a method for identifying users within defined boundaries of a location, in accordance with one embodiment of the present disclosure. In this embodiment, the music service provider 460 may provide a service for generating location-based playlists for room 470. In one embodiment, the music service provided may be presented to a user who has logged into his or her music account. If the user logs in with a smartphone, a music application of the music service may present the user with an icon, input, or button signaling availability of the service for location-based playlist generation. A user who has logged into his or her music account and who is within the boundaries of room 470 may connect to the music service, for example, by selecting the application. Selection of the application may include, e.g., tagging on an application, going to an internet address using a browser, etc.

In this example, five users (user 410, user 420, user 430, user 440, and user 450) are located within the boundaries (e.g., physical walls) of room 470. Each user has a user device with an application for accessing the music services provided by the music service provider 460. User 410 and user 450 have logged into their respective music accounts managed by the music service provider 460. User 420, user 430, and user 440 have not logged into their respective music accounts online. The music service provider 460 may identify user 410 and user 450 based on location data and can aggregate the music preferences of user 410 and user 450. The music service provider 460 may further generate a playlist 495 and provide access to the generated playlist 495 to the user devices of user 410 and user 450.

In the example illustrated in FIG. 4, it is assumed that user 410 owns all or a large portion of the music tracks listed in the generated playlist 495. Accordingly, the user device 480 of user 410 may be used to access the generated playlist 495 to listen to the music tracks in the playlist 495. In other embodiments, the user device 480 of user 410 and the user device (not shown) of user 450 may only be allowed to listen to songs that a user owns, even if they are part of the generated playlist 495. In another embodiment, after the user device 480 of user 410 has started to play a music track owned by user 410 in the playlist 495, the music service provider 460 may identify that the next music track to be played in the playlist 495 is not owned by user 410, but by user 450. After finishing playing the current music track, the user device (not shown) of user 450 may be utilized to play the next music track.

In one embodiment, the music service provider 460 may be utilized to send user identifications of other users within the same location to an identified user if those users are social network friends of the identified user. For example, after user 410 and user 450 have been identified by the music service provider 460, if user 420, user 430, and user 440 who are social network friends of user 410, have not connected to the music service provided by the music service provider 460, the identification of user 420, user 430, and user 440 may be sent to 410 by the music service provider 460, so that user 410 has the option of inviting user 420, user 430, and user 440 to join in the music service for generating playlists for room 470. In one embodiment, the invitation sent by user 410 may be in the form of an email, a text message, a social network notification or post, or via chat messages. Once user 420, user 430, and user 440 accept the invitation from user 410 to connect to the music service for generating playlists for room 470, the music preferences of user 420, user 430, and user 440 may be aggregated. Accordingly, the playlist 495 may be adjusted based on the newly aggregated music preferences based on the music preferences of existing identified users (user 410 and user 450) and the newly identified users (user 420, user 430, and user 440).

Figure 5:
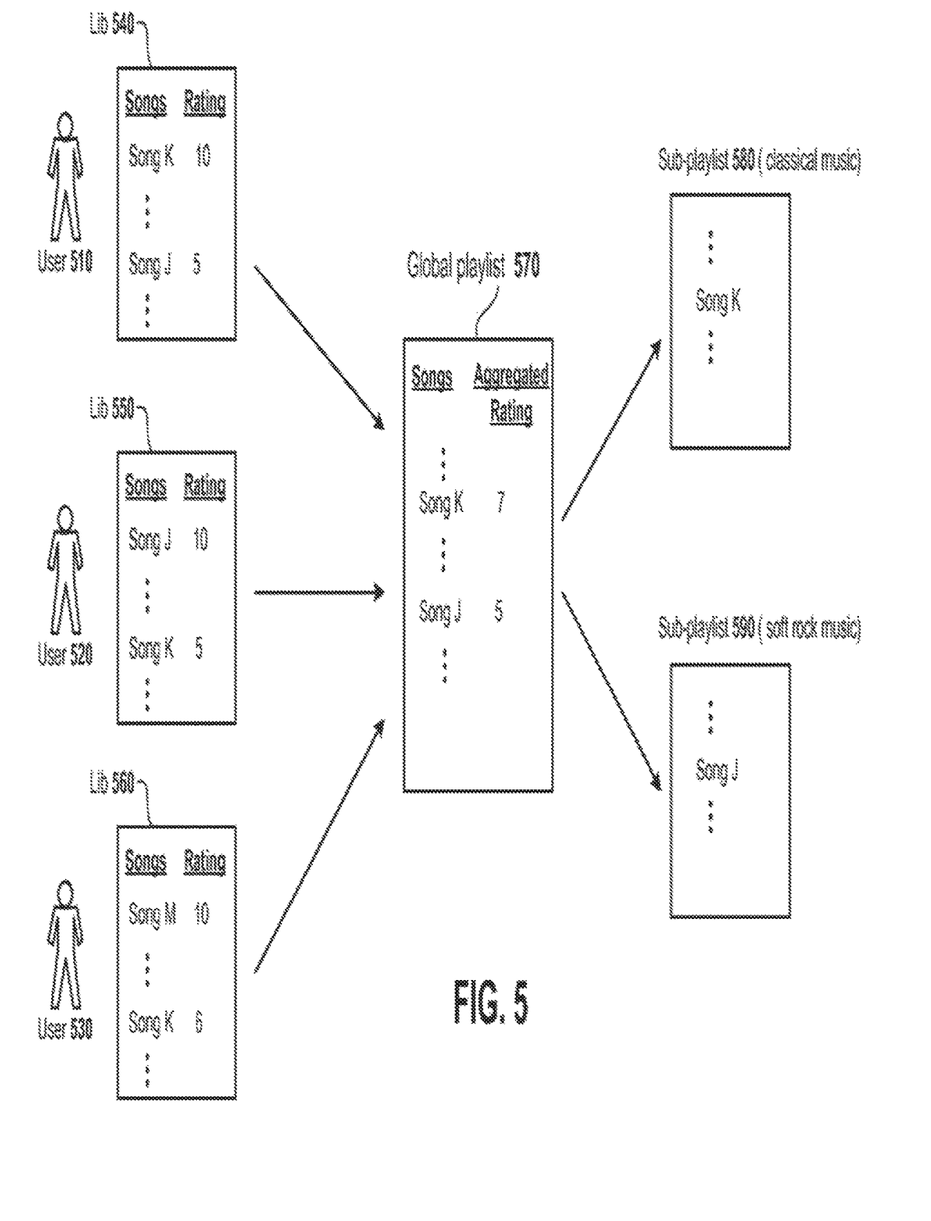
FIG. 5 illustrates a method for generating location-based playlists based on music preferences of the identified users, in accordance with one embodiment of the present disclosure.

FIG. 5 illustrates a method for generating location-based playlists based on music preferences of the identified users, in accordance with one embodiment of the present disclosure. In this embodiment, three users (user 510, user 520, and user 530), who have logged into their respective music accounts online, are identified within the defined boundaries of a location. Each of the identified users has established a music account online, and each established music account has a music library, e.g., lib 540 in user 510's music account, lib 550 in user 520's music account, and lib 560 in user 530∝s music account. Each of the music libraries of each of the identified users stores a plurality of music tracks owned by the identified user. As shown, user 510 owns song K with a rating 10 and song J with a rating 5 in his or her music library (lib 540); user 520 owns song J with a rating 10 and song K with a rating 5 in his or her music library (lib 550); user 530 owns song M with a rating 10 and song K with a rating 6 in his or her music library (lib 560).

In one embodiment, a user's music preference for a song may be identified by each song's rating. In the example shown in FIG. 5, the rating of a song in a user's music library may range from 1 to 10, with a rating 10 indicating the most favorite song and a rating 1 indicating the least favorite song. Other ratings can be a thumbs-up, thumbs-down, plus vote, negative vote, one or more stars, etc. Accordingly, the rating of 1-10 is only provided as an example for ease of understanding. Further, in one embodiment, the rating may be directly given by the user who owns or is playing the song. In other embodiments, each rating may be generated by a music provider logic (e.g., the music logic 311 of the music manager server 310 in FIG. 3), based on user music listening histories, such as how many times the song has appeared in the user's own playlists, how many times the user has played the song, shared the song, etc.

In one embodiment, the rating for each song in each user's music library may be aggregated by averaging the ratings of a song for each of the identified users. For example, for song K, the aggregated music preference, e.g., the aggregated rating=(10 (user 510's rating)+5 (user 520's rating)+6 (user 530's rating))/3 (number of identified users)=7. In another example, for song J, the aggregated music preference, e.g., the aggregated rating=(5 (user 510's rating)+10 (user 520's rating)+0 (user 530 does not own song J))/3 (number of identified users)=5. Accordingly, a global playlist 570 may be generated based on the aggregated music preferences of the identified users (user 510, user 520, and user 530), including song K with an aggregated rating of 7 and song J with an aggregated rating of 5. In this embodiment, although song M is owned by user 530, because both user 510 and user 520 do not own song M, song M may be excluded from the generated global playlist 570. In other embodiments, song M may be suggested to the other users by way of a social action.

In one embodiment, the generated playlist 570 may include a songs column showing the list of songs, an aggregated rating column showing the aggregated ratings of the songs. In another embodiment, the generated global playlist may also include a category column (not shown) showing the music category for each song in the global playlist 570.

In one embodiment, one or more sub-playlists may be generated based on the generated global playlist. Each sub-playlist may include a portion of the songs of the global play list having the same music category. In the example illustrated in FIG. 5, if song K is a classical music track and song J is a soft rock music track, song K may be listed in the sub-playlist 580 that shows all of the classical music tracks in the global playlist 570, and song J may be listed in the sub-playlist 590 that shows all of the soft rock music tracks in the global playlist 570.

Figure 6:
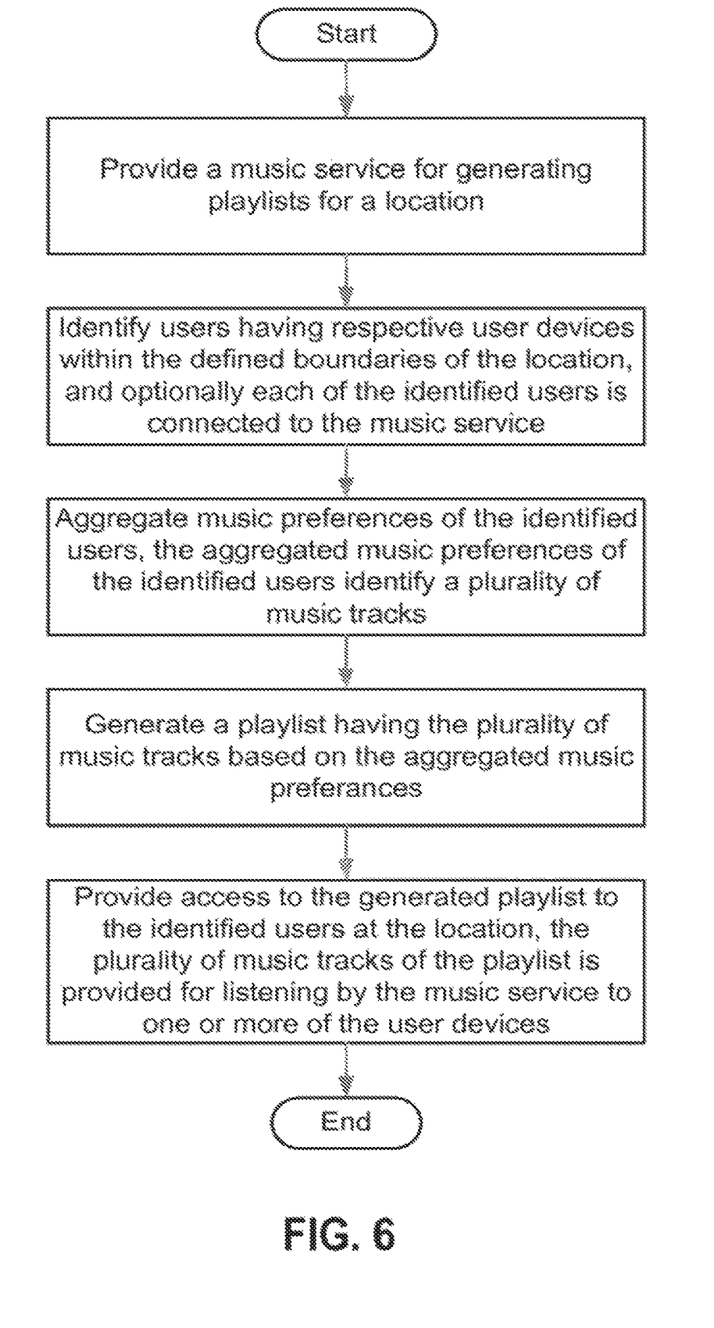
FIG. 6 illustrates a flow diagram of an example method for generating location-based playlists, in accordance with one embodiment of the present disclosure.

FIG. 6 illustrates a flow diagram of an example method 600 for generating location-based playlists, in accordance with one embodiment of the present disclosure. In one embodiment, the illustrated exemplary method 600 is described in relation to operations performed by the music provider logic 114, as shown in FIG. 3. As used herein, the term "music provider logic" is used to connote a system that can manage the musical recommendation functionality for users. As such, so long as the functionality is provided, any name may be provided for "music provider logic".

In operation 610, a music service for generating playlists for a location is provided. In one embodiment, the music service for generating playlists for a location may be provided by the music logic 311, of the music manager server 310, of the music provider logic 114, as shown in FIG. 3.

In operation 620, the users who are within the defined boundaries of the location are identified. Each of identified users has a user device, through which the identified users may be connected to the music service. In one embodiment, the identified users are connected to the music service via the user access module 317, as shown in FIG. 3, after logging into their respective music accounts online. In one embodiment, the defined boundaries of the location may be walls of a room, exterior walls of a building, a section of a building, approximate GPS location and associated radius, WiFi locations, map location, vertical height and X-Y location, a building floor, etc.

In operation 630, the music preferences of the identified users may be aggregated and the aggregated music preferences of the identified users identify a plurality of music tracks. The identified music tracks are obtained from the user's playlists, songs purchased, songs played, songs shared, songs commented on, etc. In one embodiment, the aggregation of the music preferences of the identified users may be performed by the recommendation framework 312 of the music manager server 310, of the music provider logic 114, as shown in FIG. 3. In one embodiment, the music preferences of the identified users may be defined by analysis of music listening histories of the identified users.

In operation 640, a playlist is generated based on the aggregated music preferences, and the playlist includes the plurality of music tracks. In one embodiment, the recommendation framework 312 of the music manager server 310 of the music provider logic 114, as shown in FIG. 3, may be used to generate the playlist. In one embodiment, the generated playlist is a playlist that includes music tracks in various music categories identified by the aggregated music preferences. In another embodiment, the recommendation framework 312 of the music manager server 310 of the music provider logic 114, as shown in FIG. 3, may be used to generate sub-playlists based on the global playlist, where each sub-playlist includes a portion of the music tracks listed in the global playlist having the same music category.

In operation 650, the music service may provide the generated playlist to the identified users at the location for listening through one or more user device. In one embodiment, the user access module 317 of the music manager server 310 of the music provider logic 114 in FIG. 3 may be utilized to provide the playlist to the one or more user devices. In one embodiment, the user access module 317 of the music manager server 310 of the music provider logic 114, as shown in FIG. 3, may be used to choose which user device will be used for music track listening. As the playlist was generated for users that are at a location, any one of the devices belonging to the user at the location can be used to access and play the songs. In one embodiment, the user devices of the identified users who own all or a large portion of the music tracks listed in the generated playlist may be chosen for music track listening. In another embodiment, the music tracks of the playlist may be played by the user device of the user that owns the music tracks.

Figure 7:
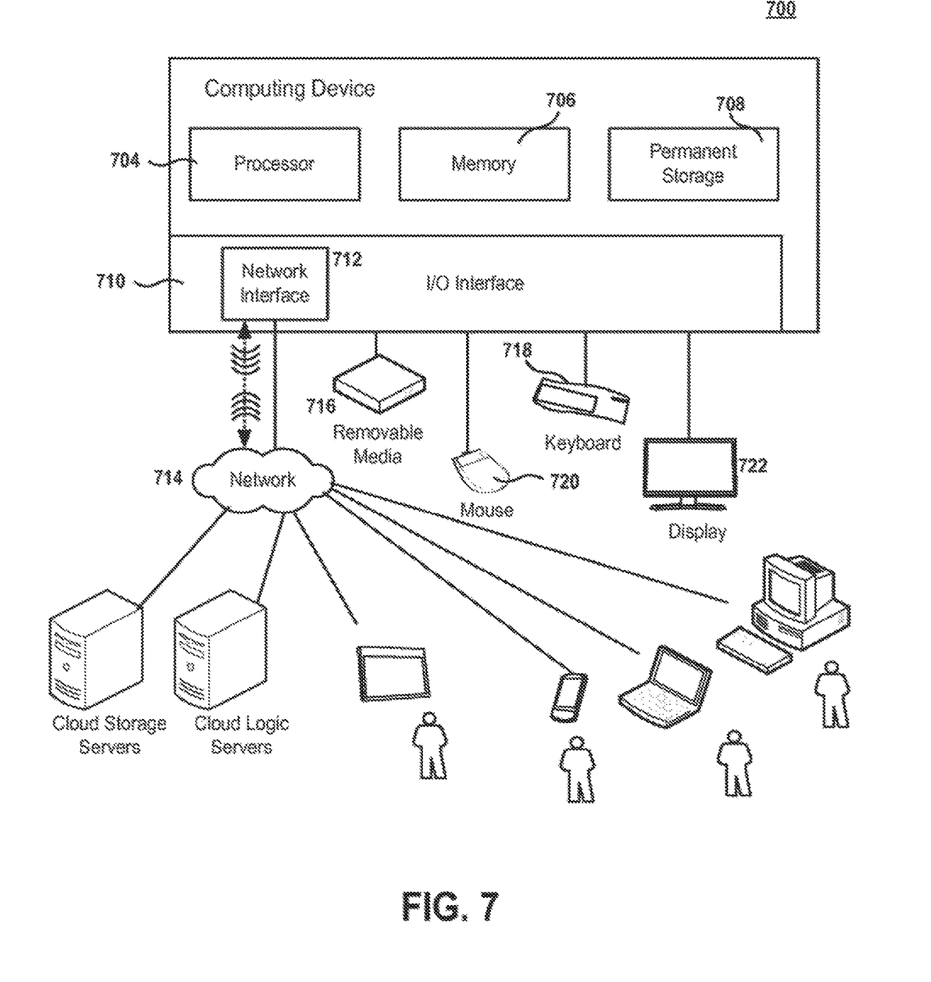
FIG. 7 is a simplified schematic diagram of a computer system for implementing embodiments of the present disclosure.

FIG. 7 is a simplified schematic diagram of a computer system 700 for implementing embodiments of the present disclosure. FIG. 7 depicts an exemplary computer environment for implementing embodiments of the disclosure. It should be appreciated that the methods described herein may be performed with a digital processing system, such as a conventional, general-purpose computer system. Special purpose computers, which are designed or programmed to perform only one function, may be used in the alternative. The computer system 700 includes a processor 704, which is coupled through a bus to memory 706, permanent storage 708, and Input/Output (I/O) interface 710.

Permanent storage 708 represents a persistent data storage device such as a hard drive or a USB drive, which may be local or remote. Network interface 712 provides connections via network 714, allowing communications (wired or wireless) with other devices. It should be appreciated that processor 704 may be embodied in a general-purpose processor, a special purpose processor, or a specially programmed logic device. Input/Output (I/O) interface 710 provides communication with different peripherals and is connected with processor 704, memory 706, and permanent storage 708, through the bus. Sample peripherals include display 722, keyboard 718, mouse 720, removable media device 716, etc.

Display 722 is configured to display the user interfaces described herein. Keyboard 718, mouse 720, removable media device 716, and other peripherals are coupled to I/O interface 710 in order to exchange information with processor 704. It should be appreciated that data to and from external devices may be communicated through I/O interface 710. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 708, network attached storage (NAS), read-only memory or random-access memory in memory module 706, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Additionally, FIG. 7 shows various types of devices that can connect to the network, such as the internet. The devices include servers, tablet computers, smartphones, laptops, desktops, etc. The various devices run operating systems and the operating systems can vary from manufacturer to manufacturer.

Some, or all operations of the method presented herein are executed through a processor, such as processor 704 of FIG. 7. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

The invention claimed is:

1. A method for generating location-based playlists, comprising:
   providing, using a server that includes a hardware processor, a music service for generating playlists for a location;
   identifying, using the hardware processor, users having respective user devices within defined boundaries of the location, wherein each of the identified users is connected to the music service;
   aggregating, using the hardware processor, music preferences of the identified users, the aggregated music preferences of the identified users identifying a plurality of music tracks;
   identifying, using the hardware processor, one or more outlier users from the identified users, the one or more outlier users having music preferences different than music preferences of a majority of the identified users;
   excluding, using the hardware processor, the music preferences of the outlier users from the aggregated music preferences;
   generating, using the hardware processor, a playlist having the plurality of music tracks based on the aggregated music preferences; and
   providing, using the hardware processor, access to the generated playlist to the identified users at the location, the plurality of music tracks of the generated playlist being provided for listening by the music service to one or more of the user devices.

2. The method of claim 1, further comprising:
   adjusting the generated playlist when a new user enters the location and is connected to the music service, or when any of the identified users exits the location.

3. The method of claim 1, further comprising:
   disconnecting the access to the generated playlist to an identified user when the identified user exits the location.

4. The method of claim 1, further comprising:
   filtering the identified users based on social affinity.

5. The method of claim 1, wherein the aggregating of the music preferences of the identified users is based on music listening histories of the identified users.

6. The method of claim 1, wherein the one or more of the user devices used for listening to the plurality of music tracks of the generated playlist are user devices of the identified users who owns all or a large portion of the plurality of music tracks of the generated playlist.

7. The method of claim 1, wherein the defined boundaries of the location are walls of a room or exterior walls of a building or a section of a building.

8. The method of claim 1 wherein the identifying of the users having respective user devices is based on tracking data of the users devices.

9. The method of claim 1, further comprising:
   generating a plurality of sub-playlists based on music categories of the plurality of music tracks of the generated playlist, wherein each of the plurality of sub-playlists includes a portion of the plurality of music tracks of the generated playlist having same music category.

10. The method of claim 1, wherein the plurality of music tracks of the generated playlist is respectively stored in music libraries of the identified users.

11. The method of claim 1, further comprising:
    storing the generated playlist in a record for the location in a database.

12. A system for generating location-based playlists, comprising:
    music logic configured to,
      provide a music service for generating playlists for a location, and
      identify users having respective user devices within defined boundaries of the location, wherein each of the devices have access to the music service;
    a recommendation framework configured to,
      aggregate music preferences of the identified users, the aggregated music preferences of the identified users identifying a plurality of music tracks,
      identify one or more outlier users from the identified users, the one or more outlier users having music preferences different than music preferences of a majority of the identified users,
      exclude the music preferences of the outlier users from the aggregated music preferences, and
      generate a playlist having the plurality of music tracks based on the aggregated music preferences;
    a user access module configured to provide access to the generated playlist to the identified users at the location, the plurality of music tracks of the generated playlist being provided for listening by the music service to one or more of the user devices, and
    at least one processor configured to execute the music logic, the recommendation framework, and the user access module.

13. The system of claim 12, wherein the recommendation framework is further configured to adjust the generated playlist when a new user enters the location and is connected to the music service, or when any of the identified users exits the location.

14. The system of claim 13, wherein the recommendation framework is further configured to generate a plurality of sub-playlists based on music categories of the plurality of music tracks of the generated playlist, each of the plurality of sub-playlists including at least a portion of the plurality of music tracks of the generated playlist having same music category.

15. The system of claim 13, wherein the user access module is further configured to disconnect the access to the generated playlist to an identified user when the identified user exits the location.

16. The system of claim 13, further comprising:
filtering logic configured to filter the identified users based on social affinity.

17. The system of claim 16, further comprising:
a social media server configured to provide social network information to be used to define the social affinity.

18. A non-transitory computer-readable medium encoding instructions for generating location-based playlists that, in response to execution by a computing device, cause the computing device to perform operations comprising:

providing a music service for generating playlists for a location;

identifying users having respective user devices within defined boundaries of the location, wherein each of the identified users is detected to be connected to the music service;

aggregating music preferences of the identified users, the aggregated music preferences of the identified users identifying a plurality of music tracks;

identifying one or more outlier users from the identified users, the one or more outlier users having music preferences different than music preferences of a majority of the identified users;

excluding the music preferences of the outlier users from the aggregated music preferences;

generating a playlist having the plurality of music tracks based on the aggregated music preferences; and providing access to the generated playlist to the identified users at the location, the plurality of music tracks of the generated playlist being provided for listening by the music service to one or more of the user devices.

* * * * *